United States Patent [19]

Davis

[11] 4,395,996
[45] Aug. 2, 1983

[54] FUEL SUPPLY AND CONDITIONING MEANS FOR DIESEL ENGINES

[75] Inventor: Leland L. Davis, Saline, Mich.

[73] Assignee: Davco Incorporated, Ann Arbor, Mich.

[21] Appl. No.: 312,330

[22] Filed: Oct. 16, 1981

[51] Int. Cl.³ .......................................... F02M 31/00
[52] U.S. Cl. ................................... 123/557; 210/181; 210/186
[58] Field of Search ................ 123/557; 210/180, 181, 210/184, 177

[56] References Cited

U.S. PATENT DOCUMENTS

| | | | |
|---|---|---|---|
| 1,318,068 | 10/1919 | Giesler | 123/557 |
| 2,068,395 | 1/1937 | Burckhalter | 210/181 |
| 2,437,453 | 3/1948 | Belgay | 165/132 |
| 2,980,172 | 4/1961 | Thompson | 165/132 |
| 3,122,014 | 2/1964 | Dobbins | 165/132 |
| 3,354,872 | 11/1967 | Gratzmuller | 123/557 |
| 3,768,730 | 10/1973 | Campbell | 236/122 |
| 3,913,543 | 10/1975 | Richard | 123/557 |
| 4,003,356 | 1/1977 | Naylor | 123/557 |
| 4,091,265 | 8/1975 | Richards et al. | 219/501 |
| 4,091,782 | 5/1978 | Dunnam | 123/557 |
| 4,354,946 | 10/1982 | Warlich | 210/184 |

*Primary Examiner*—Ronald H. Lazarus
*Attorney, Agent, or Firm*—Harness, Dickey & Pierce

[57] ABSTRACT

Diesel engine fuel treating means which heats the fuel flowing from the fuel tank to the engine also furnishes heat to the fuel in the tank, provides for removal of contaminants, and inhibits gelling and wax solidification. In some embodiments the heating device is incorporated in the fuel tank, and includes a fuel filter intimately associated with the treating device but accessible outside the tank. In another embodiment the treating device is located outside the tank and includes two fuel heating circuits, one for fuel flowing to the engine and the other for preheating the main fuel supply in the tank. A third embodiment has an axial tubular member which conducts heated and filtered fuel from a top-mounted spin-on filter back through the heating chamber in a second pass and also forms a clamping device for a removable cover and an attaching and fluid coupling device for the filter.

7 Claims, 7 Drawing Figures

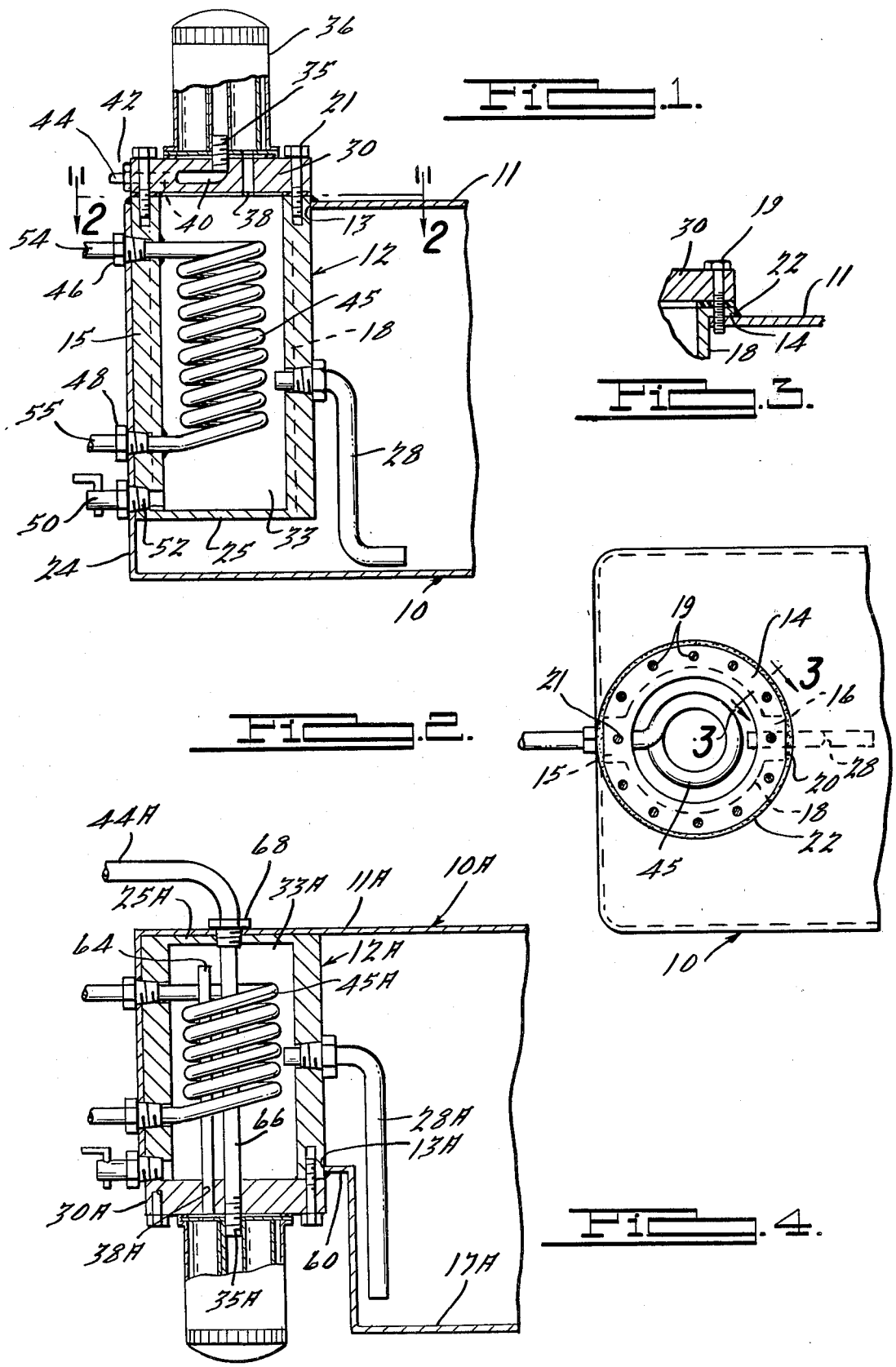

FUEL SUPPLY AND CONDITIONING MEANS FOR DIESEL ENGINES

BACKGROUND OF THE INVENTION

The provision of means for preheating the fuel used in vehicular diesel engines which are operated in cold climates, and for removing water and other contaminants from the fuel, has become increasingly important, and various types of diesel fuel heating and treating apparatus have been proposed.

The present invention has the objective of providing simple, inexpensive, effective and reliable diesel fuel conditioning apparatus of an improved design which is also simple and inexpensive to service and maintain, and which incorporates an easily replaceable fuel filter.

Another object of the invention is to provide improved fuel conditioning apparatus which is adapted to be installed in the fuel tank of the vehicle.

Still another object is to provide such improved fuel conditioning apparatus which is effective to preheat both the fuel which is fed to the engine and the fuel in the fuel tank.

Other objects and advantages of the invention will be apparent to persons skilled in the art upon consideration of the present disclosure in its entirety.

BRIEF DESCRIPTION OF THE FIGURES OF DRAWING

FIG. 1 is a fragmentary vertical sectional view of a diesel engine fuel tank equipped with fuel conditioning means constructed in accordance with the present invention;

FIG. 2 is a sectional view taken substantially on the line II—II of FIG. 1 and looking in the direction of the arrows;

FIG. 3 is a detailed sectional view taken substantially on the line III—III of FIG. 2 and looking in the direction of the arrows;

FIG. 4 is a view similar to FIG. 1 showing a modified construction;

DETAILED DESCRIPTION OF PREFERRED FORMS OF THE INVENTION

Figure 5:
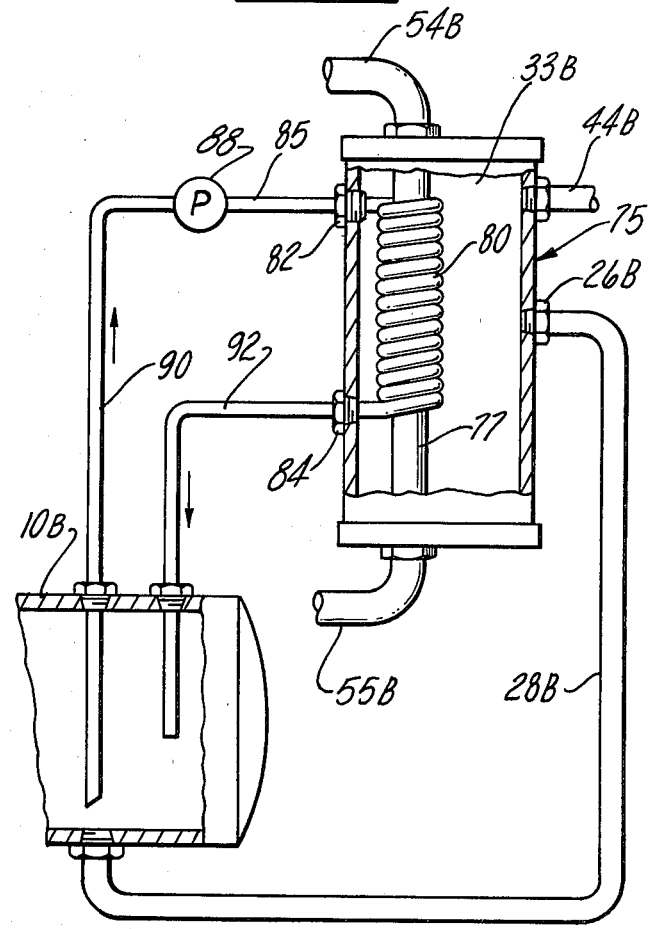
FIG. 5 is a perspective view of a further modified fuel conditioning means, partly broken away and diagrammatically showing related components.

As shown in FIGS. 1-3, inclusive, the tank 10, which is presumed to be the fuel tank of a vehicle, has an upper wall 11 in which an opening 13 is formed which is proportioned to permit the insertion of a generally cylindrical canister 12 in such manner as to depend into the tank closely against the side wall 24. The canister is provided with an outturned top flange 14 which overlies the top wall 11 in the area surrounding the opening 13. At diametrically opposite positions the generally circular side wall of the canister is provided with vertically extending ribs 15, 16 formed integrally with the thinner remaining portions 18 of the canister wall and extending outwardly substantially the same distance as the top flange 14 but having flat external surfaces, as indicated at 20. The opening 13 is shaped to receive the ribs 15, 16 and tops of the ribs and the periphery of flange 14 are preferably welded to the top of tank wall 11 as indicated at 22, FIG. 3.

The outer surface 20 of one of the ribs as 15 lies flat against the side wall 24 of the tank 10.

A fuel inlet conduit 28 is secured in and enters the interior of the canister through the rib 16 and extends to a position close to the bottom wall 17 of the tank. Fuel flows from the tank into the canister through conduit 28 under the influence of a fuel pump (not shown) which may be of conventional construction.

The top of the canister is closed by a plate 30 which acts both as a cover and as a coupling member. Plate 30 is secured in place by suitable machine screws 21 which extend into the ribs 15, 16, as shown in FIG. 1, and by additional screws 19 which extend through the plate 30 and flange 14 and into tapped holes in the tank wall 11. The plate 30 which thus forms a top closure for the chamber 33 within the canister is provided with a centrally disposed upstanding threaded coupling nipple 35 so proportioned and threaded as to receive a standard spin-on type replaceable oil filter 36. An offset oil delivery passage 38 extends vertically through the plate to deliver oil from the chamber 33 to the filter. The oil flows radially inwardly through the filter, and then downwardly through nipple 35 in the conventional manner. A horizontal passage 40 in the plate 30 communicates with nipple 35 and constitutes the fuel outlet passage, terminating in a coupling 42 for the fuel line 44 which delivers fuel to the engine.

Chamber 33 contains fuel heating means in the form of a heat exchanger comprising a helically coiled tube 45 which is adapted to be connected to the engine cooling fluid system, although it will be recognized that other heat sources, including electrical heaters, might be used. In the preferred construction shown, the upper and lower ends of the heating coil 45 extend outwardly through rib 15 and through aligned openings in tank wall 24. The openings in the rib 15 and wall 24 are sealed, and sealed with respect to the extremities of the tubing 45, by the threaded compression coupling members 46, 48. Coupling members 46, 48 are threaded into conformably tapped openings in the side rib 15 of the canister, and when tightened draw the rib portion of the canister wall tightly against the tank wall 24.

An external drain valve 50 has a threaded support and inlet spigot 52 similarly threadedly fitted into and extending through the wall 24 and rib 15 at the bottom of chamber 33, to enable draining water and other contaminants. Conduits 54, 55, connected to the couplings 46, 48, are adapted to be connected to suitable portions of the cooling fluid circuit of the engine, as for example in parallel with the cab heater. The heat thus supplied effectively warms the fuel in chamber 33, and by means of heat transmitted from the heated fuel through the canister walls, also furnishes heat to the main body of fuel in the tank 10.

The canister body is formed of metal, and its walls therefore conduct heat effectively to the fuel in the tank, but it will be noted that heat loss to the atmosphere is limited by the fact that the rib 15 which engages the wall of the tank is of limited cross section, and as shown in FIGS. 1 and 2, the canister is preferably spaced from the other walls of the tank, except for the engagement of the upper rim with the top wall. The heat bridge provided by the canister wall at such upper rim is also of limited cross section.

In the modified construction shown in FIG. 4, parts corresponding to those already described are designated by similar reference numerals distinguished by the addition of the letter "A", and many such parts will not require redescription.

The tank 10A is modified by the provision of a horizontal, upwardly displaced inset wall portion 60, located at one end of the bottom wall 17A. The canister 12A is inserted upwardly, but in similar fashion, through an opening 13A in wall portion 60, and is sealed, supported and connected in similar manner by the bottom-located cover and coupling plate 30A. A tube 64 connected to the oil inlet passage 38A in the plate 30A extends upwardly through the interior of the heating coil 45A to deliver oil to the filter 36A from the upper portion of the chamber 33A.

A tubular extension 66 of the filter coupling portion 35A also extends upwardly through the heating coil 45A to an outlet coupling 68, fitted in and extending through the top wall 11A of the tank and through end wall 25A of the canister and is adapted to be connected to a fuel delivery conduit 44A.

In the further modification shown in FIG. 5, the substantially cylindrical canister 75 is adapted to be installed outside the tank 10B by attachment to any convenient support (not shown) such as the fire wall of the vehicle, but preferably at a position on or close to the fuel tank.

The heating element comprises a heat conductive metal tube 77 which extends longitudinally through the chamber of the canister and is sealed in the end walls for connection to cooling fluid inlet and outlet tubes as 54B, 55B.

The fuel inlet line 28B to the canister extends from a connection at the bottom of the main fuel tank 10B to an inlet coupling 26B in the side wall of the canister.

Means are provided for delivering heat directly to the main body of fuel in the tank 10B from the heating source in the canister by circulating fuel from the tank to the canister and then back to the tank. A heat absorbing coil generally designated 80 is wrapped around the heat tube 77 in intimate heat conductive association therewith, and may be sweat-soldered thereto for optimum heat conduction. The coil 80 extends for only a portion of the length of the heater tube 77, so that heat from tube 77 is exchanged both with the fuel flowing to the engine through chamber 33B and with recirculating main tank fuel. The ends of coil 80 are connected to couplings 82, 84 which are sealed in and extend through the side wall of the canister for connection to lines 85, 92 leading from and to the tank 10B. The line 85 is connected to the outlet of a circulating pump diagrammatically indicated at 88, which is in turn connected to a pickup conduit 90 which extends downwardly into the tank to a pickup point at the lower end of the tube 90, which point is located close to the point of connection of the engine fuel inlet line 28B. Warmed fuel led back to the tank through return line 92 is also directed toward the point of connection of the engine fuel pickup line 28B, so that the warming effect on the fuel at the pickup area of the tank takes place as soon as possible.

In the embodiment of FIG. 5, as in the embodiment of FIG. 4, it will be recognized that a number of components corresponding to those previously described and which are designated by reference numerals corresponding to those of the first embodiment but distinguished by the addition of the letter "B" will not require further description.

Figure 6:
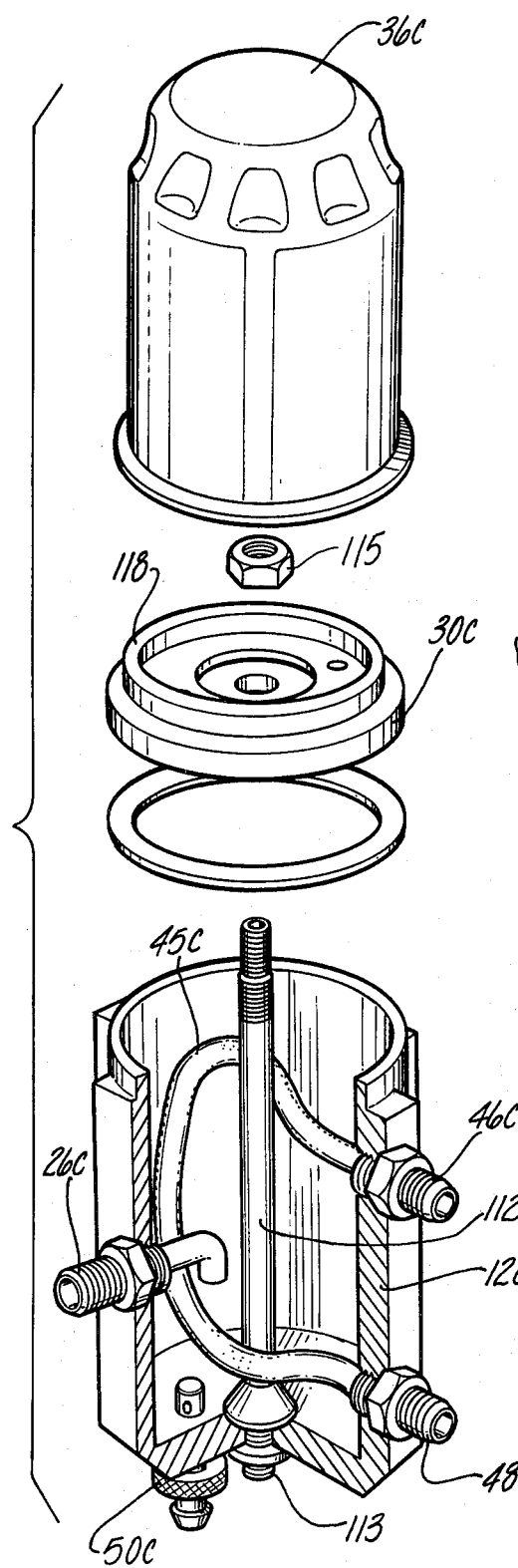
FIG. 6 is a exploded perspective view, partly in cross section, of a further modification.
Figure 7:
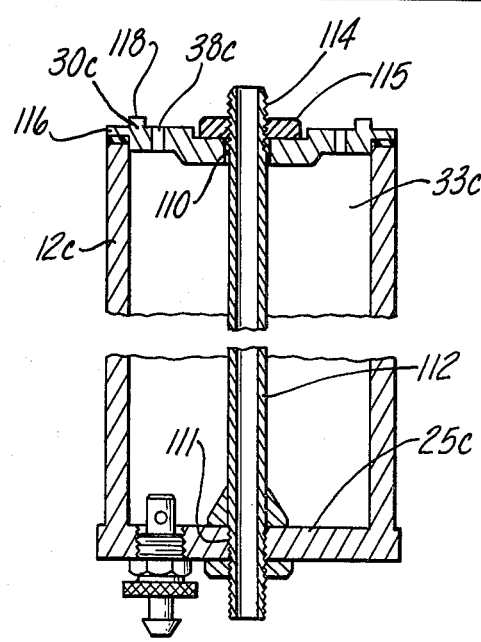
FIG. 7 is a diametric longitudinal section of the canister assembly, with the heating element omitted.

The further modification illustrated in FIG. 6 and 7 is shown as adapted for installation outside the main fuel tank, although it could readily be adapted for in-tank installation. Again, it will be recognized that some parts will not require detailed redescription. Parts analogous to parts already disclosed will be indicated by similar reference numerals distinguished by the letter "C".

The cover 30C and the bottom wall 25C of the canister body 12C have coaxial holes 110, 111 extending therethrough. A rigid tubular metal member 112 which for convenience may be termed a "standpipe" extends axially through the canister and extends through and projects from the bottom wall 25C and cover 30C. The standpipe performs several functions, including those of providing a through bolt for securing the cover to the canister, supporting a spin-on filter, providing a fuel-conducting coupling for the filter, providing a heat-absorbing return conduit for the fuel, and providing a fuel outlet coupling for the assembly.

The lower end 113 of the standpipe 112 is threaded into and sealed with respect to the bottom wall opening 111, and projects therefrom to receive a conformably threaded fluid outlet fitting (not shown), to which a fuel line to the engine is adapted to be connected. The opening 110 in the cover slides over the projecting threaded upper extremity 114 of the standpipe. A nut 115 is threadable onto the projecting extremity 114 to secure the cover and to force its gasketed rim portion 116 into tight sealing engagement with the top of the canister. Suitable gasketing is if course provided at the other jointed positions also, as where the standpipe passes through the cover and bottom wall.

The projecting upper extremity 114 of the standpipe is also so threaded and proportioned as to be adapted to receive a conventional spin-on type fuel filter 36C, the gasket of which (not shown) seals against an annular seat 118 which encircles orifices 38C in the cover. Orifices 38C conduct fuel from the treating chamber 33C to the filter inlet.

As shown in FIG. 6, fuel inlet connection 26C and fluid inlet and outlet connections 46C, 48C for a tubular heating element 45C extend through and are sealed in the side walls of the canister, similarly to corresponding connections previously described.

It will be seen that the filter can be changed quickly, without disturbing the remainder of the assembly, but that by removing the cover 30C, the interior of the canister is also readily accessible.

This detailed description of the preferred forms of the invention, and the accompanying drawings, have been furnished in compliance with the statutory requirements to set forth the best modes contemplated by the inventors of carrying out the invention. The prior portions consisting of the "Abstract of the Disclosure" and the "Background of the Invention" are furnished without prejudice to comply with administrative requirements of the Patent and Trademark Office.

While the preferred forms of the invention have been illustrated and described, it will be recognized that changes may be made within the fair and reasonable scope of the appended claims without departing from the properly patentable scope of the invention.

I claim:

1. Diesel engine fuel supply and conditioning means comprising in combination with a fuel supply tank having a wall portion with an opening therein, a heat exchanger assembly extending into the tank from said opening and having a fuel inlet within the tank, means for positioning the heat exchanger with respect to the tank and for sealing said opening and for mounting a fuel filter on the tank in close proximity to the heat exchanger, comprising a combined cover and coupling member secured to the heat exchanger and to said wall portion in peripherally sealed engagement with said wall portion around said opening and with the heat exchanger, means on said member outside the tank for removably supporting a fuel filter thereon, and fuel delivery passages in said member including a passage extending from the interior of the heat exchanger to the inlet of a filter attached to said member, and a passage extending from the filter to a fuel outlet carried by said member.

2. Means as defined in claim 1 wherein the tank has a wall lying generally at right angles to the first mentioned wall portion, the heat exchanger having a side portion lying closely against the interior of said wall.

3. Means as defined in claim 2 including heater fluid circulating means carried by the heat exchanger in heat conductive communication with an interior fuel-containing portion of the heat exchanger, and heater fluid inlet and outlet means extending through said wall and through said side portion of the heat exchanger for delivery of heater fluid to and discharge of the same from said heater fluid circulating means.

4. Means as defined in claim 2 including heater means carried by the heat exchanger in heat conductive communication with an interior fuel-containing portion of the heat exchanger, and heater connecting means extending through said wall.

5. Means as defined in claim 1 wherein the tank has top and bottom wall parts, said first mentioned wall portion comprising a recessed section of one of said wall parts.

6. Means as defined in claim 1 wherein said heat exchanger has fuel containing walls of high heat conductivity directly exposed within the tank.

7. Means as defined in claim 1 wherein said heat exchanger has walls formed of a material of high heat conductivity defining a fuel segregating and treating chamber exposed to contact by fuel within the tank, and heater means in said chamber.

* * * * *

UNITED STATES PATENT AND TRADEMARK OFFICE
CERTIFICATE OF CORRECTION

PATENT NO. : 4,395,996

DATED : August 2, 1983

INVENTOR(S) : Leland L. Davis

It is certified that error appears in the above-identified patent and that said Letters Patent is hereby corrected as shown below:

On the Title Page, Reference: 4,091,782, "5/1978" should be --6/1976--.

Column 1, line 68, after "and" insert --the--.

Column 4, line 30, "if" should be --of--.

Signed and Sealed this

First Day of November 1983

[SEAL]

Attest:

GERALD J. MOSSINGHOFF

Attesting Officer

Commissioner of Patents and Trademarks